(12) United States Patent
Shetty et al.

(10) Patent No.: US 12,325,217 B2
(45) Date of Patent: Jun. 10, 2025

(54) COMBINED MATERIAL HONEYCOMB CORE

(71) Applicant: The Boeing Company, Arlington, VA (US)

(72) Inventors: Kishora Shetty, Bangalore (IN); Vishnuraj Linga Raj, Chennai (IN); Jayakumar Palani, Chennai (IN); Vigneshwaramoorthy Kannaian, Thanjavur (IN)

(73) Assignee: The Boeing Company, Arlington, VA (US)

( * ) Notice: Subject to any disclaimer, the term of this patent is extended or adjusted under 35 U.S.C. 154(b) by 4 days.

(21) Appl. No.: 18/317,068

(22) Filed: May 13, 2023

(65) Prior Publication Data

US 2024/0375372 A1    Nov. 14, 2024

(51) Int. Cl.
| | |
|---|---|
| *B32B 3/12* | (2006.01) |
| *B21D 13/00* | (2006.01) |
| *B32B 7/12* | (2006.01) |
| *B32B 15/04* | (2006.01) |
| *B32B 15/20* | (2006.01) |
| *B32B 37/12* | (2006.01) |
| *B32B 38/00* | (2006.01) |

(Continued)

(52) U.S. Cl.
CPC ............ *B32B 3/12* (2013.01); *B32B 7/12* (2013.01); *B32B 15/04* (2013.01); *B32B 15/20* (2013.01); *B32B 37/12* (2013.01); *B32B 38/0004* (2013.01); *B32B 38/145* (2013.01); *B32B 38/1841* (2013.01); *B21D 13/00* (2013.01); *B32B 2037/1253* (2013.01); *B32B 2038/0088* (2013.01); *B32B 2305/024* (2013.01); *B32B 2311/18* (2013.01); *B32B 2311/24* (2013.01); *B32B 2605/18* (2013.01); *B33Y 10/00* (2014.12)

(58) Field of Classification Search
CPC .. B32B 3/12; B32B 7/12; B32B 15/04; B32B 15/20; B32B 37/12; B32B 38/0004; B32B 38/145; B32B 38/1841; B32B 2037/1253; B32B 2038/0088; B32B 2305/024; B32B 2311/18; B32B 2311/24; B32B 2605/18; B21D 13/00; B21D 47/02; B33Y 10/00
See application file for complete search history.

(56) References Cited

U.S. PATENT DOCUMENTS

| | | | | |
|---|---|---|---|---|
| 3,016,315 A | * | 1/1962 | Robinson | B31D 3/0207 428/116 |
| 3,200,489 A | * | 8/1965 | Keeleric | B31D 3/02 428/116 |

(Continued)

OTHER PUBLICATIONS

Yerbolat et al., "Composite Materials Property Determination by Rule of Mixture and Monte Carlo Simulation." 2018 IEEE International Conference on Advanced Manufacturing, 2018, pp. 384-387. (Year: 2018).*

(Continued)

*Primary Examiner* — Christopher W Raimund
(74) *Attorney, Agent, or Firm* — Yee & Associates, P.C.

(57) ABSTRACT

A combined material honeycomb core and methods of manufacture are presented. The combined material honeycomb core comprises a plurality of cells arranged in columns and rows formed of multiple materials, the multiple materials comprising a metallic material and either a second metallic material or a non-metallic material.

20 Claims, 9 Drawing Sheets

(51) Int. Cl.
    *B32B 38/18*        (2006.01)
    *B33Y 10/00*        (2015.01)

(56) References Cited

U.S. PATENT DOCUMENTS

| | | | | |
|---|---|---|---|---|
| 5,897,739 | A | * | 4/1999 | Forster ................. B29D 24/007 |
| | | | | 156/292 |
| 7,988,809 | B2 | | 8/2011 | Smith et al. |
| 9,284,036 | B2 | * | 3/2016 | Kook ........................ B64C 1/18 |
| 2003/0190452 | A1 | * | 10/2003 | Lucas .................... B32B 27/04 |
| | | | | 428/116 |
| 2006/0272279 | A1 | * | 12/2006 | Palumbo ................... E04B 1/86 |
| | | | | 52/783.1 |
| 2008/0044621 | A1 | * | 2/2008 | Strauss ................. B22F 3/1125 |
| | | | | 428/116 |

OTHER PUBLICATIONS

Loctite, Technical Process Bulletin, Loctite EA 9690 Aero Modified Epoxy Film Adhesive, Henkel Corp. Aerospace, Sep. 2013, https://dhsutherland.com/wp-content/uploads/2019/02/loctite_ea_9690_technical_data_sheet.pdf. (Year: 2013).*
"Expanding aluminium honeycomb core," Corex Honeycomb, accessed May 9, 2023, 4 pages.https://corex-honeycomb.com/expanding-aluminium-honeycomb-core/.
Wikipedia, "Honeycomb structure," Wikimedia Foundation, Inc., last edited on Mar. 28, 2023, accessed May 9, 2023, 5 pages.https://en.wikipedia.org/wiki/Honeycomb_structure.

* cited by examiner

COMBINED MATERIAL HONEYCOMB CORE

BACKGROUND INFORMATION

1. Field

The present disclosure relates generally to honeycomb cores and more specifically to manufacturing honeycomb cores with multiple materials.

2. Background

Honeycomb panels are used in manufacturing portions of aircraft and other platforms, such as trains, ships, buildings, or other platforms. Honeycomb cores are sandwiched between two facesheets to form honeycomb panels. Hollow honeycomb cores result in honeycomb panels having lower weight than solid panels. However, honeycomb panels can have limited mechanical properties.

Therefore, it would be desirable to have a method and apparatus that takes into account at least some of the issues discussed above, as well as other possible issues.

SUMMARY

An embodiment of the present disclosure provides a combined material honeycomb core. The combined material honeycomb core comprises a plurality of cells arranged in columns and rows formed of multiple materials, the multiple materials comprising a metallic material and either a second metallic material or a non-metallic material.

Another embodiment of the present disclosure provides a structural panel with a combined material honeycomb core. The structural panel comprises the combined material honeycomb core comprising a plurality of cells formed of multiple materials, a first facesheet adhered to a first face of the combined material honeycomb core, and a second facesheet adhered to a second face of the combined material honeycomb core. The multiple materials comprise a metallic material and either a second metallic material or a non-metallic material.

Yet another embodiment of the present disclosure provides a method of manufacturing a combined material honeycomb core. Adhesive lines are printed onto a sheet of a first material and a sheet of a second material. The sheet of the first material and the sheet of the second material are cut into portions. The portions are stacked to form a stack comprising the first material and the second material. The adhesive in the stack is cured to form an adhered stack. The adhered stack is expanded to form the combined material honeycomb core.

A further embodiment of the present disclosure provides a method of manufacturing a combined material honeycomb core. A plurality of sheets of a first material is corrugated to form a first plurality of sheets of corrugated material. A plurality of sheets of a second material is corrugated to form a second plurality of sheets of corrugated material. The first plurality of sheets of corrugated material and the second plurality of sheets of corrugated material are adhered to form a honeycomb having an array of cells. The adhesive is cured, joining the array of cells of the honeycomb to form the combined material honeycomb core.

A yet further embodiment of the present disclosure provides a method of manufacturing a combined material honeycomb core. Two materials are three-dimensionally printed to form a honeycomb having an array of cells, each cell of the array of cells comprising the two materials.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
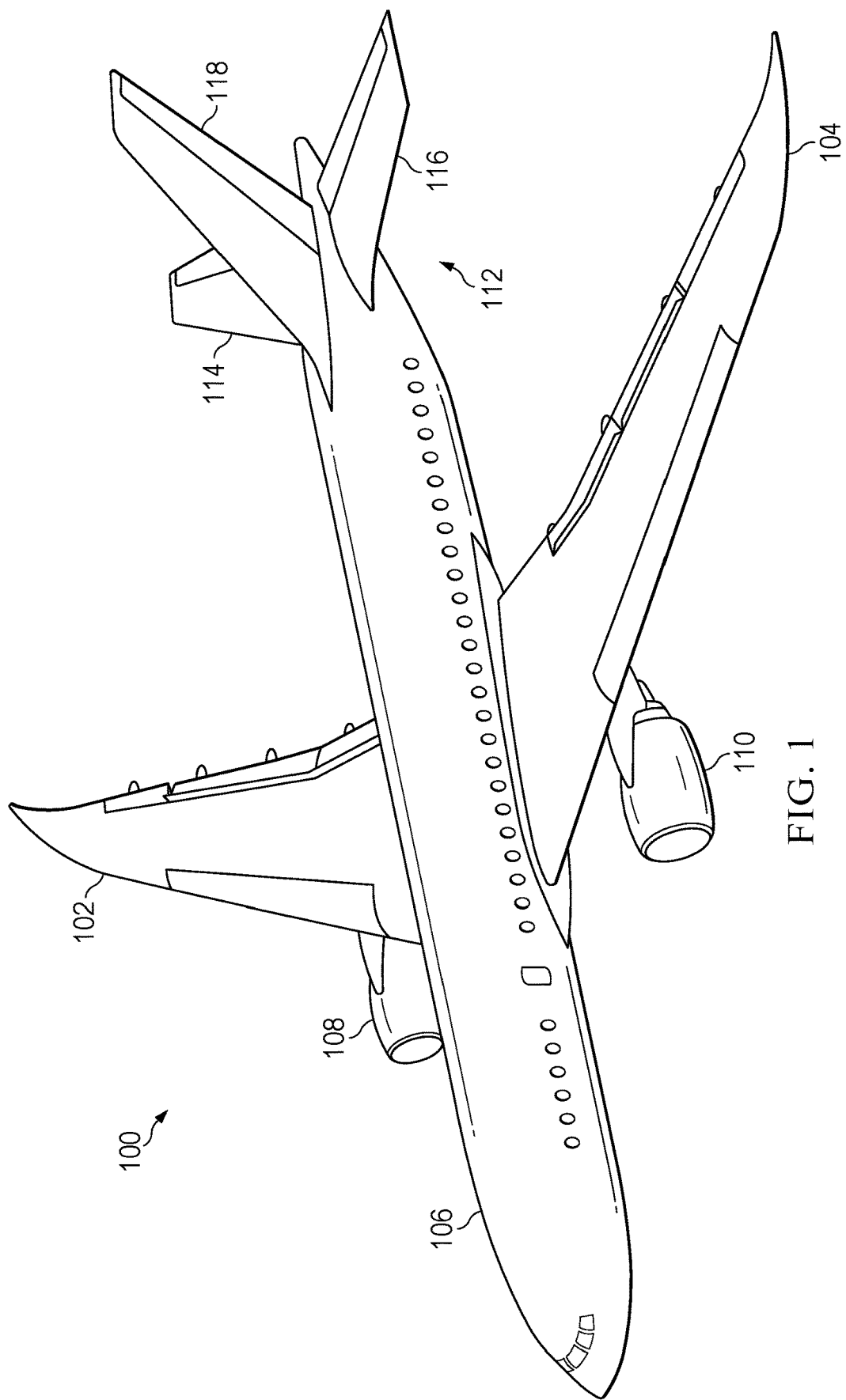
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft that can have panels with a combined material honeycomb core. For example, at least one of wing 102, wing 104, or body 106 can be formed of a combined material honeycomb core.

Figure 2:
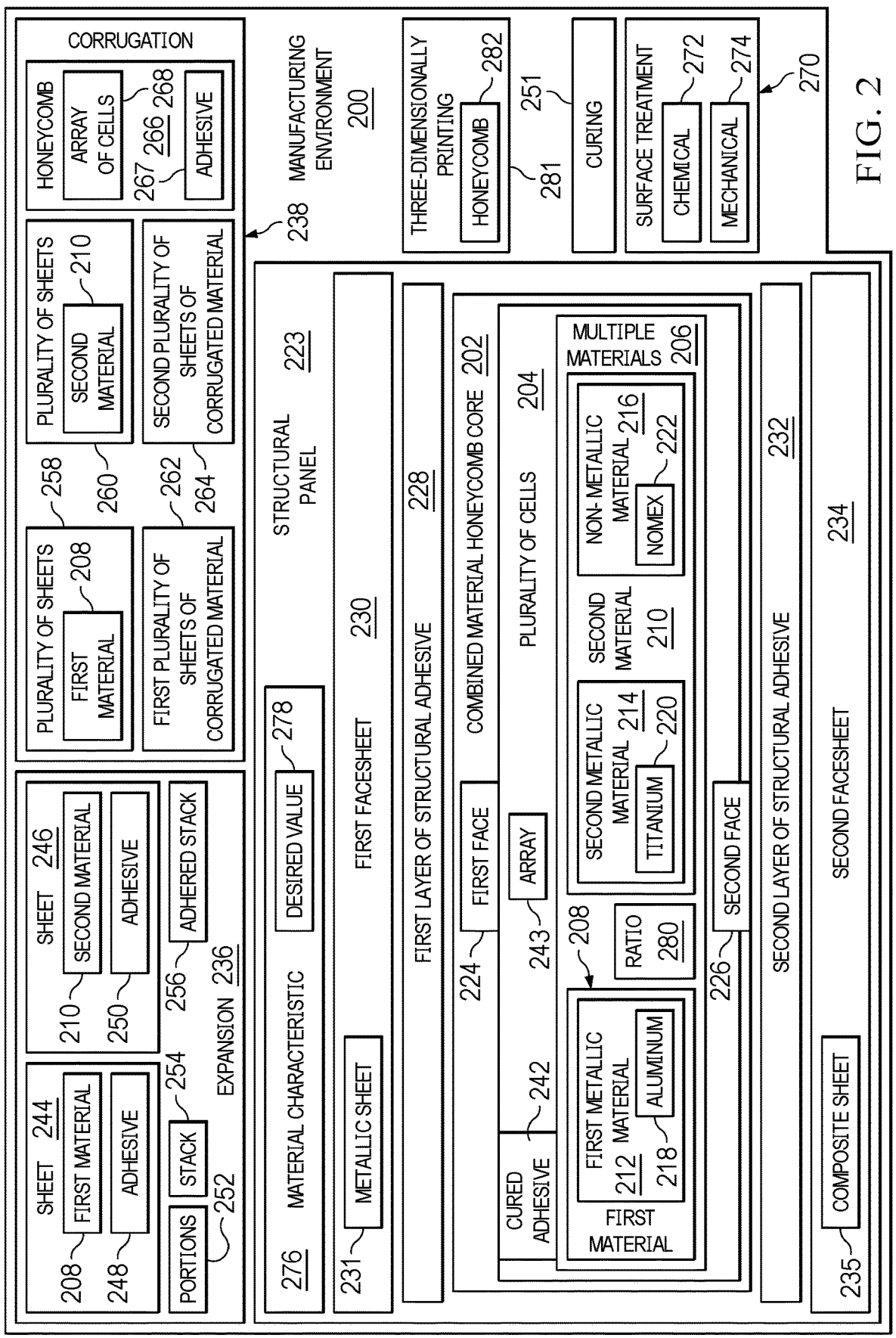
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 is an environment in which portions of aircraft 100 of FIG. 1 can be manufactured. Combined material honeycomb core 202 can be manufactured in manufacturing environment 200. Combined material honeycomb core 202 comprises plurality of cells 204. Plurality of cells 204 has any desirable shape. In some illustrative examples, each cell of plurality of cells 204 has the same shape. In other illustrative examples, plurality of cells 204 comprises a plurality of shapes. In some illustrative examples, plurality of cells 204 comprises at least one of triangular, square, hexagonal, or circular cells. Combined material honeycomb core 202 can be formed with any desirable cell size. In some illustrative examples, combined material honeycomb core 202 can instead be referred to as a combined material cellular core.

Combined material honeycomb core 202 comprises plurality of cells 204 formed of multiple materials 206 and regularly arranged in array 243. Multiple materials 206 comprises first metallic material 212 and either second metallic material 214 or non-metallic material 216. Second metallic material 214 is different from first metallic material 212.

Array 243 is an ordered arrangement of plurality of cells 204. In some illustrative examples, array 243 can be referred to as a two-dimensional lattice. Array 243 includes plurality of cells 204 positioned such that multiple cells extend in each of the two dimensions. Array 243 can be described as a plurality of stacked rows of cells or a plurality of stacked layers of cells.

Each cell of plurality of cells 204 comprises first metallic material 212 and either second metallic material 214 or non-metallic material 216. In some illustrative examples, first metallic material 212 comprises aluminum 218, and second metallic material 214 is titanium 220. In some illustrative examples, first metallic material 212 comprises aluminum 218, and non-metallic material 216 comprises Nomex 222.

Nomex 222 is a meta-aramid material. Although Nomex 222 is listed specifically, non-metallic material 216 can be any other desirable meta-aramid material.

In some illustrative examples, combined material honeycomb core 202 further comprises cured adhesive 242 joining plurality of cells 204. Cured adhesive 242 takes the form of any desirable type of structural adhesive.

Cured adhesive 242 can take the form of at least one of epoxy liquid, epoxy paste, or film adhesives. Considerations in selecting a type of adhesive for joining combined material honeycomb core 202 include temperature exposure, acoustical absorption, moisture/humidity, heat transfer, or outgassing requirements.

In some illustrative examples, cured adhesive 242 is the same material as first layer of structural adhesive 228. In some illustrative examples, cured adhesive 242 is the same material as second layer of structural adhesive 232. In some illustrative examples, at least one of cured adhesive 242, first layer of structural adhesive 228, or second layer of structural adhesive 232 are formed of the same adhesive.

Considerations for joining at least one of honeycomb cores or structural panels include increasing corrosion/wear protection, mechanical properties including shear, tensile, compression, creep, impact, fatigue and peel. Strength of structural panel 223 will vary depending upon density of combined material honeycomb core 202, toughness of adhesive, direction of peel, type of surface preparation, etc.

Structural epoxy adhesive systems feature the highest tensile strengths of all commercially available bonding agents. Resistance to moisture, fuels, oils, acids, bases, and many other aggressive chemicals is of a very high order over a wide temperature range. Structural epoxy adhesive systems can safely be operated at service temperatures from as high as 300° C. (572° F.) to cryogenic conditions. When bonding dissimilar metals, the epoxy adhesive bond also functions as protection against galvanic corrosion.

In some illustrative examples, structural panel 223 is manufactured with combined material honeycomb core 202. Structural panel 223 with combined material honeycomb core 202 comprises combined material honeycomb core 202 comprising plurality of cells 204 formed of multiple materials, first facesheet 230, and second facesheet 234. The multiple materials comprise first metallic material 212 and either second metallic material 214 or non-metallic material 216. First facesheet 230 is adhered to first face 224 of combined material honeycomb core 202. Second facesheet 234 is adhered to second face 226 of combined material honeycomb core 202.

In some illustrative examples, structural panel 223 is referred to as a honeycomb panel. In some illustrative examples, structural panel 223 is referred to as a honeycomb core panel. In some illustrative examples, structural panel 223 is referred to as a cellular core panel.

In some illustrative examples, first facesheet 230 and second facesheet 234 are formed of different materials. In some illustrative examples, first facesheet 230 comprises a metallic material and second facesheet 234 comprises a composite material. In some illustrative examples, first facesheet 230 takes the form of metallic sheet 231. In some illustrative examples, second facesheet 234 takes the form of composite sheet 235.

In some illustrative examples, first layer of structural adhesive 228 is between first facesheet 230 and first face 224 of combined material honeycomb core 202. In some illustrative examples, second layer of structural adhesive 232 is between second facesheet 234 and second face 226 of combined material honeycomb core 202. In some illustrative examples, first layer of structural adhesive 228 and second layer of structural adhesive 232 are formed of a same adhesive material.

The illustrative examples provide combined material honeycomb cores for composite structures. The combined material honeycomb cores comprise multiple materials. In some illustrative examples, the combined material honeycomb cores comprise two different metals. When two metals are present, percentages of each metal can be adjusted to tailor material properties of the combined material honeycomb core. For example, percentages of first metallic material 212 and second metallic material 214 can be adjusted to tailor material properties of combined material honeycomb core 202.

In some illustrative examples, combined material honeycomb core 202 comprises non-metallic material 216 and first metallic material 212 forming cell walls of combined material honeycomb core 202. Non-metallic material 216 provides improved tension of combined material honeycomb core 202 while first metallic material 212 provides improved compression of combined material honeycomb core 202. By combining first metallic material 212 and non-metallic material 216 into combined material honeycomb core 202, combined material honeycomb core 202 can have tailored material properties.

Non-metallic material 216 comprises at least one of Nomex 222, paper, aramid fiber, thermoplastic, PVC foam, polystyrene foam, PMI (polymethacrylimide) foam, styrene acrylonitrile (SAM) co-polymer foam, or other desirable polymeric foams. First metallic material 212 comprises at least one of aluminum 218, titanium, aluminum alloys, titanium alloys, superalloys, or stainless steels. In some illustrative examples, combined material honeycomb core 202 can include more than one metallic material to modify or tailor material properties.

In some illustrative examples, each cell of combined material honeycomb core 202 is formed of both first metallic material 212 and non-metallic material 216. In some illustrative examples, combined material honeycomb core 202 comprises alternating sheets of metallic material and non-metallic material. In some illustrative examples, the combined material honeycomb core comprises a combination of Nomex and aluminum. In some illustrative examples, the combined material honeycomb core comprises a combination of aluminum and titanium.

Forming combined material honeycomb core 202 of first material 208 and second material 210 having different material properties allows for tailoring physical properties of structural panel 223. Improved properties can result from combining first material 208 and second material 210 to form combined material honeycomb core 202.

Ratio 280 of first material 208 and second material 210 can be modified to change a value of material characteristic 276. In some illustrative examples, desired value 278 of material characteristic 276 is determined. In some illustrative examples, ratio 280 of first material 208 and second material 210 within combined material honeycomb core 202 is set based on desired value 278 of material characteristic 276. When combined material honeycomb core 202 comprises aluminum 218 and Nomex 222, combined material honeycomb core 202 has improved properties for structural panel 223. Material characteristic 276 can include at least one of weight, strength to weight ratio, volume density, compressive strength, shear strength, heat transfer, electrical shielding, insulation, fatigue strength, or any other desirable characteristic.

Combined material honeycomb core 202 provides improved properties over a single material honeycomb core formed of either first metallic material 212 or second material 210. In some illustrative examples, first material 208 is aluminum 218 and second material 210 is Nomex 222. Combined material honeycomb core 202 with aluminum 218 and Nomex 222 is non-flammable. In some illustrative examples, combined material honeycomb core 202 with aluminum 218 and Nomex 222 does not drip or melt, and instead only carbonizes once the temperature limit is exceeded. Combined material honeycomb core 202 with aluminum 218 and Nomex 222 is inherently fire resistant up to 350 degrees Celsius.

Combined material honeycomb core 202 can be manufactured in any desirable fashion. In some illustrative examples, combined material honeycomb core 202 is formed using corrugation 238. In corrugation 238, sheets or plates are pressed into corrugated sheets by using gears. Then, the corrugated sheets that contain a certain shape are bonded one by one to make a whole structure, honeycomb 266. The cavities (or cells) of honeycomb 266 will be formed between each two sheets. Curing 251 is performed on the structure at a temperature of up to 180° C. (356° F.). Corrugation 238 is applicable for both metal and Non-metallic honeycombs. A combination of adhesive film/liquid adhesive and a corrugation process affords a way of making honeycomb panels formed of multiple materials. A combination of adhesive film/liquid adhesive and a corrugation process affords a way of making honeycomb panels which have modifiable material characteristics.

For example, plurality of sheets 258 of first material 208 are sent through gears to form first plurality of sheets of corrugated material 262. Plurality of sheets 260 of second material 210 are sent through gears to form second plurality of sheets of corrugated material 264. First plurality of sheets of corrugated material 262 is adhered to second plurality of sheets of corrugated material 264 to form honeycomb 266 with array of cells 268. Adhesive 267 is applied to first plurality of sheets of corrugated material 262 and second plurality of sheets of corrugated material 264 to form honeycomb 266.

Curing 251 is performed on honeycomb 266 to cure adhesive 267. Curing 251 is performed at a temperature of up to 180° C. (356° F.). Curing 251 honeycomb 266 forms combined material honeycomb core 202 with cured adhesive 242.

In some illustrative examples, combined material honeycomb core 202 is formed using expansion 236. In expansion 236, sheet 244 of first material 208 is passed through a printer for lines of adhesive 248 to be printed. Although first material 208 is described as sheet 244, in some other illustrative examples, first material 208 can be provided in a roll and may be described as a "foil".

In expansion 236, sheet 246 of second material 210 is passed through a printer for lines of adhesive 250 to be printed. After adhesive 248 has been printed onto sheet 244 and adhesive 250 has been printed onto sheet 246, sheet 244 and sheet 246 are cut into portions 252. Portions 252 are stacked to form stack 254 comprising first material 208 and second material 210. Curing 251 is performed on stack 254 to form adhered stack 256. Adhered stack 256 is expanded to form combined material honeycomb core 202.

In some illustrative examples, adhered stack 256 can be cut to a desired thickness. In some illustrative examples, adhered stack 256 can be cut into multiple thicknesses and expanded into multiple combined material honeycomb cores.

In some illustrative examples, prior to joining combined material honeycomb core 202 to first facesheet 230 and second facesheet 234, surface treatment 270 is applied to portions of combined material honeycomb core 202 to aid adhesion. In some illustrative examples, prior to joining combined material honeycomb core 202 to first facesheet 230 and second facesheet 234, surface treatment 270 is applied to portions of combined material honeycomb core 202 to increase adhesivity. Surface treatment 270 comprises at least one of chemical 272 treatment, mechanical 274 treatment, or any other desirable type of treatment to aid adhesion of combined material honeycomb core 202 to at least one of first facesheet 230 or second facesheet 234.

In some illustrative examples, surface treatment 270 includes mechanical 274 treatment to roughen a surface of at least one of first metallic material 212 or second metallic material 214 to increase adhesion of first layer of structural adhesive 228 or second layer of structural adhesive 232. In some illustrative examples, surface treatment 270 includes chemical 272 treatment to roughen a surface of at least one of first metallic material 212 or second metallic material 214 to increase adhesion of first layer of structural adhesive 228 or second layer of structural adhesive 232. In some illustrative examples, surface treatment 270 includes chemical 272 treatment to chemically modify a surface of at least one of first metallic material 212 or second metallic material 214 to increase adhesion of first layer of structural adhesive 228 or second layer of structural adhesive 232.

Surface treatment 270 is applied to metallic materials for combined material honeycomb core 202. In some illustrative examples, surface treatment 270 is applied to first material 208 prior to combining into combined material honeycomb core 202. In some illustrative examples, surface treatment 270 is applied to combined material honeycomb core 202.

In some illustrative examples, honeycomb 266 comprises only metallic materials and honeycomb 266 can have surface treatment 270 applied to honeycomb 266. In some illustrative examples, first plurality of sheets of corrugated material 262 and second plurality of sheets of corrugated material 264 are formed of metallic materials. In some of these illustrative examples, surface treatment 270 can be applied to first plurality of sheets of corrugated material 262 and second plurality of sheets of corrugated material 264 prior to forming honeycomb 266. In some illustrative examples, second plurality of sheets of corrugated material 264 is non-metallic, and surface treatment 270 is applied to first plurality of sheets of corrugated material 262 prior to combining with second plurality of sheets of corrugated material 264.

When second material 210 is second metallic material 214, surface treatment 270 can be applied to first material 208 and second material 210 during any stage of expansion 236. In some illustrative examples, surface treatment 270 can be applied to any of sheet 244, sheet 246, portions 252, stack 254, or adhered stack 256. When second material 210 is non-metallic material 216, either sheet 244 or portions 252 receive surface treatment 270 prior to forming stack 254 of first material 208 and second material 210.

In some illustrative examples, combined material honeycomb core 202 can be formed using three-dimensionally printing 281. In some illustrative examples, three-dimensionally printing 281 first material 208 and second material 210 forms honeycomb 282. In some illustrative examples, honeycomb 282 is cured to form combined material honeycomb core 202. In some illustrative examples, three-dimensionally printing 281 first material 208 and second material 210 forms combined material honeycomb core 202 without curing 251.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, in some illustrative examples, more than one material characteristic is modified to meet a desired value or a desired range by combination of first material 208 and second material 210 in combined material honeycomb core 202.

As another example, although multiple materials 206 is depicted as having first material 208 and second material 210, multiple materials 206 can have any desirable quantity of materials. In some illustrative examples, multiple materials 206 comprises more than two materials. In some illustrative examples, material characteristic 276 is modified by selecting more than two materials in multiple materials 206 and adjusting ratios of the more than two materials in multiple materials 206.

Figure 3:
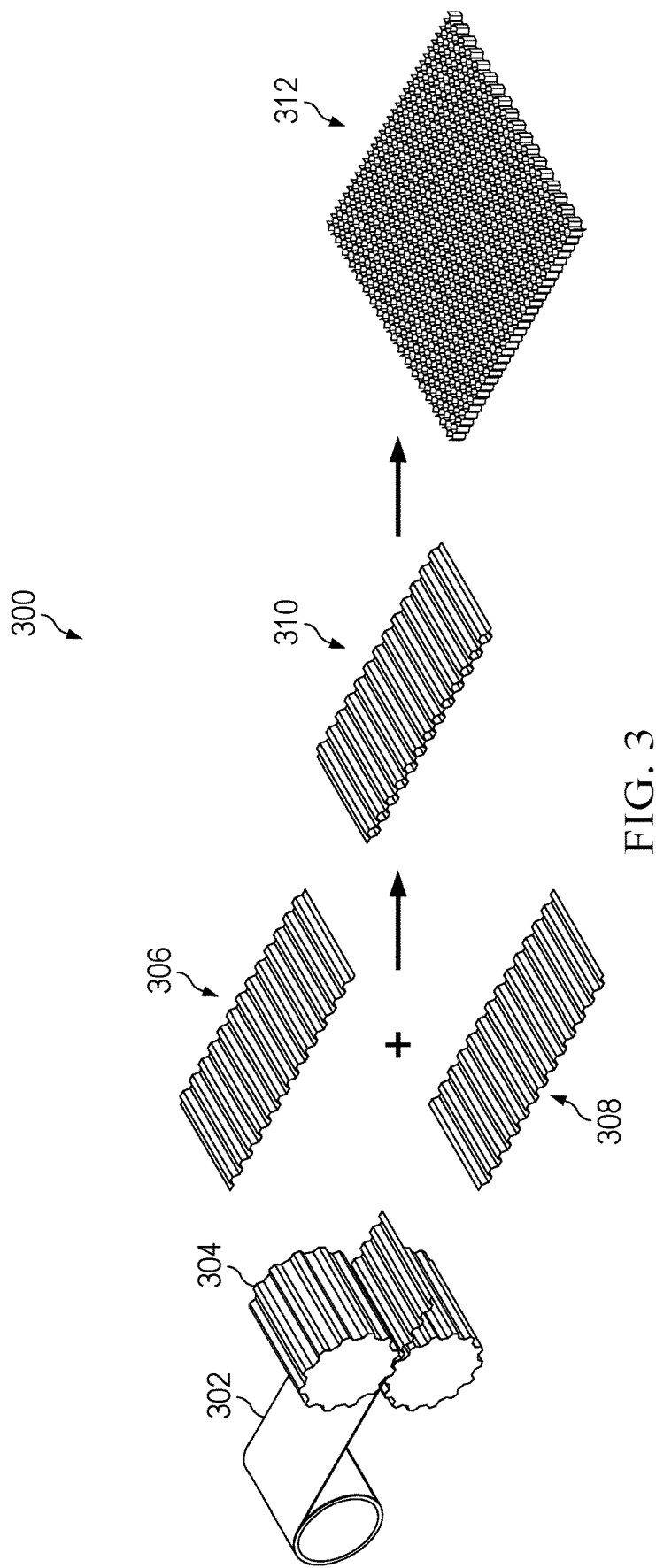
FIG. 3 is an illustration of steps to form a combined material honeycomb core in a corrugation method in accordance with an illustrative embodiment.

Turning now to FIG. 3, an illustration of steps to form a combined material honeycomb core in a corrugation method is depicted in accordance with an illustrative embodiment. The steps illustrated in view 300 can be used to manufacture components of aircraft 100 of FIG. 1. The steps illustrated in view 300 can be used in manufacturing environment 200 to form combined material honeycomb core 202 of FIG. 2 using corrugation 238. Combined material honeycomb core 312 is a physical implementation of combined material honeycomb core 202 of FIG. 2.

In the corrugation method, sheets 302 of material are sent through corrugating rollers 304 to form corrugated sheets. Although the material depicted in FIG. 3 is described as "sheets", sheets 302 may instead be referred to as "ribbons" in some illustrative examples. In some illustrative examples, the term "ribbons" may be used when a width of the material to be corrugated is short compared to the length of the material. Likewise, corrugated metallic sheet 306 and second corrugated sheet 308 can be referred to as a corrugated metallic ribbon and a second corrugated ribbon. Corrugated metallic sheet 306 is formed of a first metallic material. Second corrugated sheet 308 is formed of a second material selected from one of a second metallic material or a non-metallic material. The corrugated sheets are bonded together to form the combined material honeycomb cores. As depicted, corrugated metallic sheet 306 and second corrugated sheet 308 are adhered to form single honeycomb layer 310. Single honeycomb layer 310 is adhered to other single honeycomb layers to form combined material honeycomb core 312. After forming combined material honeycomb core 312, combined material honeycomb core 312 can be joined to facesheets to form a structural panel, such as structural panel 500 of FIG. 5.

Corrugated metallic sheet 306 is formed of any desirable metallic material. In some illustrative examples, corrugated metallic sheet 306 is formed of aluminum or an aluminum alloy. Second corrugated sheet 308 is formed of any desirable material. In some illustrative examples, second corrugated sheet 308 is formed of a non-metallic material. In some illustrative examples, second corrugated sheet 308 is formed of a second metallic material. In some illustrative examples, second corrugated sheet 308 is formed of Nomex. In some illustrative examples, second corrugated sheet 308 is formed of titanium. In some illustrative examples, corrugated metallic sheet 306 takes the form of a corrugated aluminum sheet and second corrugated sheet 308 takes the form of a corrugated titanium sheet.

In some illustrative examples, combined material honeycomb core 312 is formed of a first metallic material and a non-metallic material. In some illustrative examples, the corrugation method can be used to form combined material honeycomb core 312 of two different metallic materials.

Figure 4:
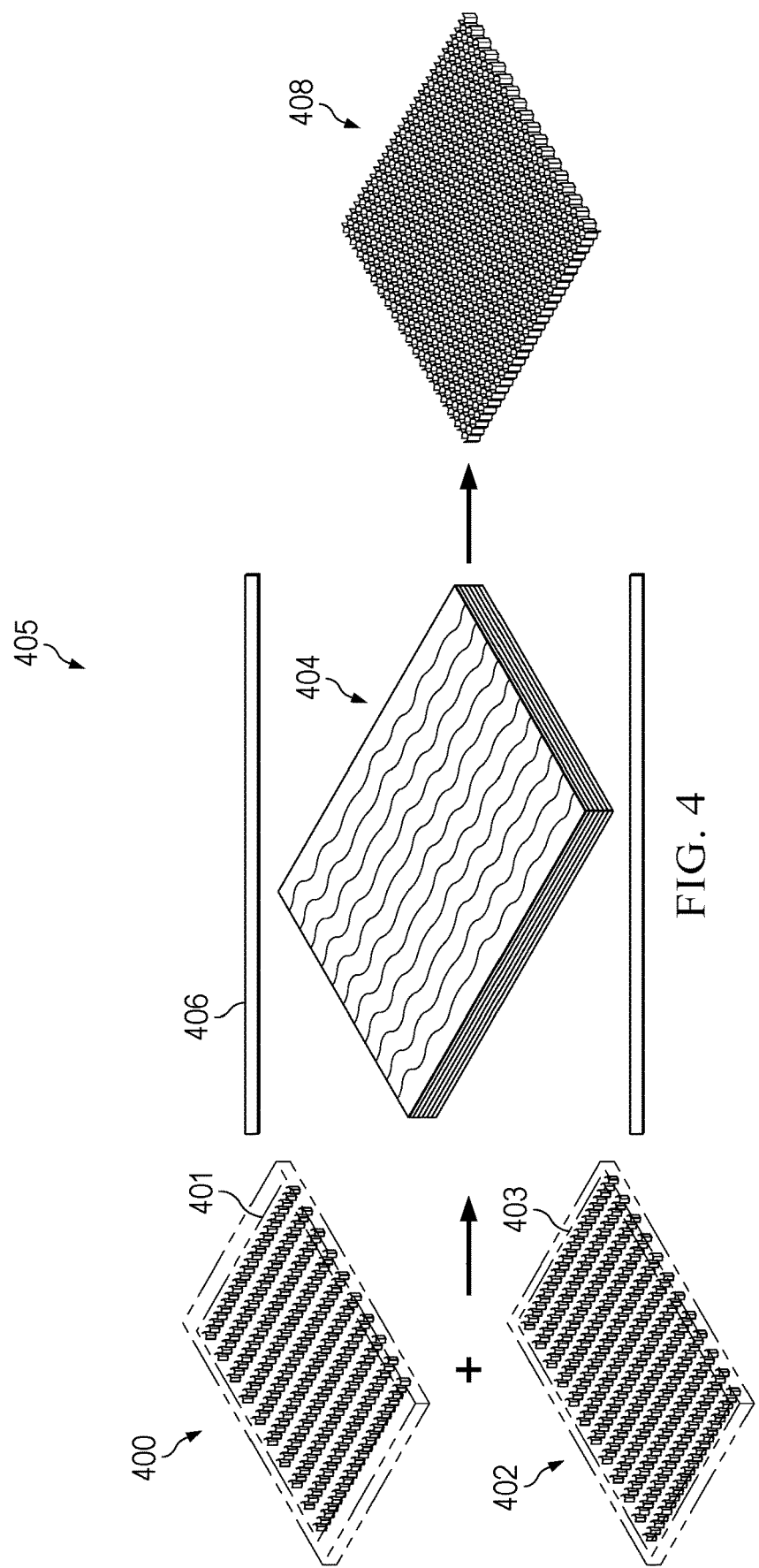
FIG. 4 is an illustration of steps to form a combined material honeycomb core in an expansion method in accordance with an illustrative embodiment.

In some illustrative examples, the combined material honeycomb cores are formed using an expansion method. Turning now to FIG. 4, an illustration of steps to form a combined material honeycomb core in an expansion method is depicted in accordance with an illustrative embodiment. In the expansion method, sheets of material have adhesive lines printed, and the sheets are cut and stacked. The steps illustrated in view 405 can be used to manufacture components of aircraft 100 of FIG. 1. The steps illustrated in view 405 can be used in manufacturing environment 200 to form combined material honeycomb core 202 of FIG. 2 using expansion 236. Combined material honeycomb core 408 is a physical implementation of combined material honeycomb core 202 of FIG. 2.

As depicted, first sheet 400 has adhesive 401 printed onto it. Second sheet 402 has adhesive 403 printed in a predetermined pattern. First sheet 400 and second sheet 402 are cut and then stacked to form stack 404. In this illustrative example, portions of first sheet 400 and second sheet 402 can be alternated. Stack 404 is heated and pressed to form a block with cured adhesive bonding the sheets. As depicted, stack 404 is in heating chamber 406. Afterwards, the block with cured adhesive is expanded to form combined material honeycomb core 408.

First sheet 400 is formed of any desirable metallic material. In some illustrative examples, first sheet 400 is formed of aluminum or an aluminum alloy. Second sheet 402 is formed of any desirable material. First sheet 400 is formed of a first metallic material. Second sheet 402 is formed of a second material selected from one of a second metallic material or a non-metallic material.

In some illustrative examples, second sheet 402 is formed of a non-metallic material. In some illustrative examples, second sheet 402 is formed of a second metallic material. In some illustrative examples, second sheet 402 is formed of Nomex. In some illustrative examples, second sheet 402 is formed of titanium. In some illustrative examples, first sheet 400 takes the form of an aluminum sheet and second sheet 402 takes the form of a titanium sheet.

Figure 5:
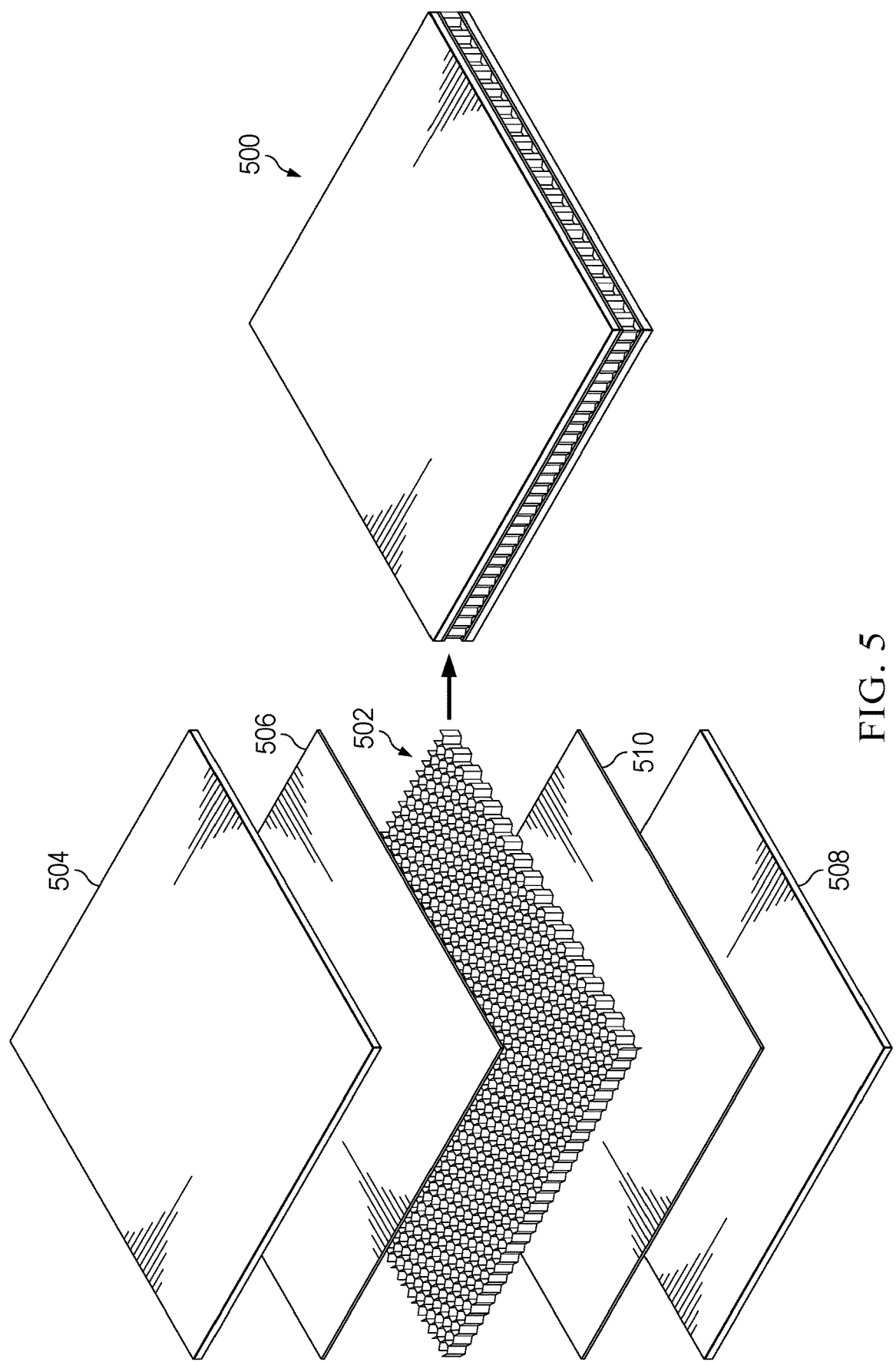
FIG. 5 is an illustration of an exploded view and an isometric view of a structural panel formed of a combined material honeycomb core in accordance with an illustrative embodiment.

Turning now to FIG. 5, an illustration of an exploded view and an isometric view of a structural panel formed of a combined material honeycomb core is depicted in accordance with an illustrative embodiment. Structural panel 500 is a physical implementation of structural panel 223 of FIG. 2. Structural panel 500 is formed by adhering facesheet 504 and facesheet 508 to combined material honeycomb core 502. Combined material honeycomb core 502 can be the same as either combined material honeycomb core 312 of FIG. 3 formed through corrugation or combined material honeycomb core 408 of FIG. 4 formed through expansion. Adhesive 506 joins facesheet 504 to combined material honeycomb core 502. Adhesive 510 joins facesheet 508 to combined material honeycomb core 502. In some illustrative examples, facesheet 504 and facesheet 508 are formed of a composite. In some illustrative examples, facesheet 504 and facesheet 508 are formed of a metal.

In some illustrative examples, adhesive 506 and adhesive 510 are structural epoxy adhesives. Adhesive 506 and adhesive 510 are selected to provide desired material properties during operating and service temperatures for a platform, such as an aircraft. Adhesive 506 and adhesive 510 are also selected to be non-reactive with both the non-metallic material and the first metallic material of combined material honeycomb core 502. Material considerations for adhesive 506 and adhesive 510 include temperature exposure, acoustical absorption, moisture/humidity, heat transfer and outgassing. Additional material considerations for adhesive 506 and adhesive 510 include corrosion/wear protection as well as mechanical properties including shear, tensile, compression, creep, impact, fatigue and peel.

Figure 6:
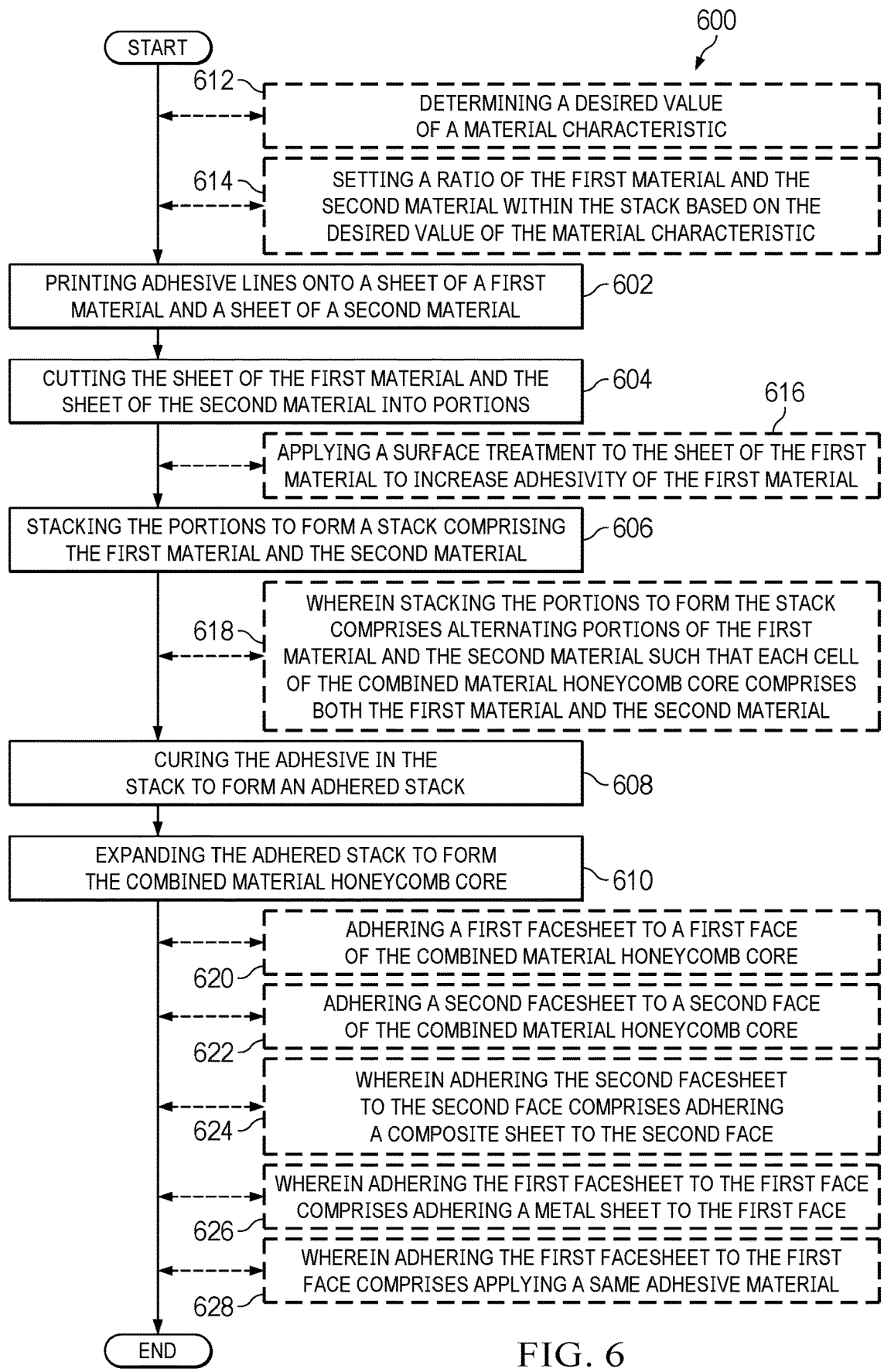
FIG. 6 is a flowchart of a method of manufacturing a combined material honeycomb core in accordance with an illustrative embodiment.

Turning now to FIG. 6, a flowchart of a method of manufacturing a combined material honeycomb core is depicted in accordance with an illustrative embodiment. Method 600 can be used to manufacture combined material honeycomb core for a portion of aircraft 100 of FIG. 1. Method 600 can be used to manufacture combined material honeycomb core 202 of FIG. 2. Method 600 can be used to manufacture a combined material honeycomb core according to expansion 236. Method 600 can be used to manufacture combined material honeycomb core 408 of FIG. 4. Method 600 can be used to manufacture combined material honeycomb core 502 of FIG. 5.

Method 600 prints adhesive lines onto a sheet of a first material and a sheet of a second material (operation 602). Method 600 cuts the sheet of the first material and the sheet of the second material into portions (operation 604). Method 600 stacks the portions to form a stack comprising the first material and the second material (operation 606). Method 600 cures the adhesive in the stack to form an adhered stack (operation 608). Method 600 expands the adhered stack to form the combined material honeycomb core (operation 610). Afterwards, method 600 terminates.

In some illustrative examples, method 600 determines a desired value of a material characteristic (operation 612). In some illustrative examples, the material characteristic can include at least one of weight, strength to weight ratio, volume density, compressive strength, shear strength, heat transfer, electrical shielding, insulation, fatigue strength, or any other desirable characteristic. In some illustrative examples, the material characteristic can include at least one of corrosion/wear protection. In some illustrative examples, the material characteristic can include a mechanical property. In some illustrative examples, the material characteristic can include at least one of shear, tensile, compression, creep, impact, or fatigue and peel. In some illustrative examples, method 600 sets a ratio of the first material and the second material within the stack based on the desired value of the material characteristic (operation 614).

In some illustrative examples, the first material is a first metallic material, and method 600 further comprises applying a surface treatment to the sheet of the first material to increase adhesivity of the first material (operation 616). In some illustrative examples, the surface treatment includes at least one of a mechanical treatment or a chemical treatment.

In some illustrative examples, stacking the portions to form the stack comprises alternating portions of the first material and the second material such that each cell of the combined material honeycomb core comprises both the first material and the second material (operation 618).

In some illustrative examples, method 600 adheres a first facesheet to a first face of the combined material honeycomb core (operation 620). In some illustrative examples, method 600 adheres a second facesheet to a second face of the combined material honeycomb core (operation 622).

In some illustrative examples, adhering the second facesheet to the second face comprises adhering a composite sheet to the second face (operation 624). In some illustrative examples, adhering the first facesheet to the first face comprises adhering a metal sheet to the first face (operation 626).

In some illustrative examples, adhering the first facesheet to the first face comprises applying a same adhesive material (operation 628).

Figure 7:
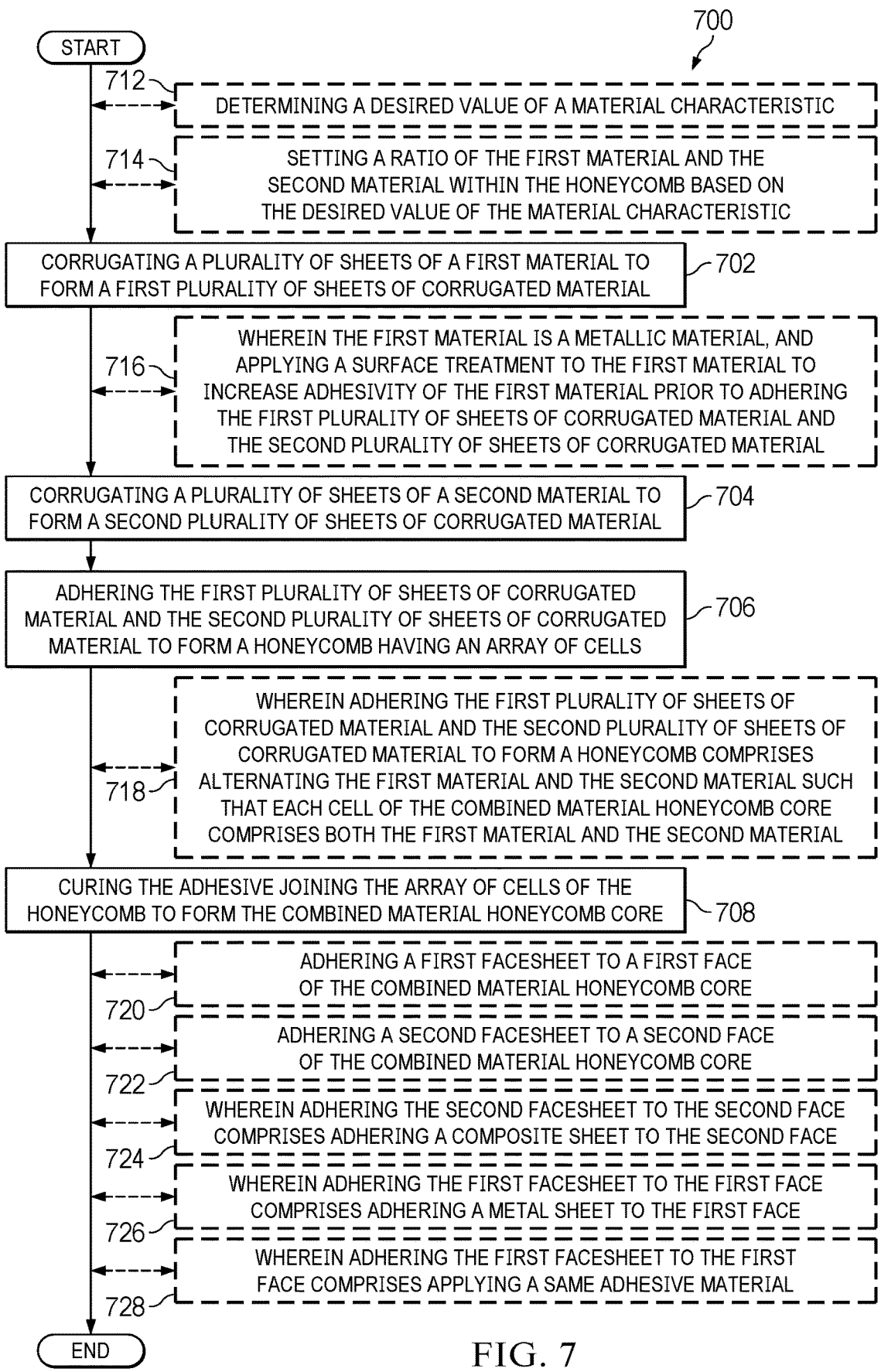
FIG. 7 is a flowchart of a method of manufacturing a combined material honeycomb core in accordance with an illustrative embodiment.

Turning now to FIG. 7, a flowchart of a method of manufacturing a combined material honeycomb core is depicted in accordance with an illustrative embodiment. Method 700 can be used to manufacture combined material honeycomb core for a portion of aircraft 100 of FIG. 1. Method 700 can be used to manufacture combined material honeycomb core 202 of FIG. 2. Method 700 can be used to manufacture a combined material honeycomb core using corrugation 238 of FIG. 2. Method 700 can be used to manufacture combined material honeycomb core 312 of FIG. 3. Method 700 can be used to manufacture combined material honeycomb core 502 of FIG. 5.

Method 700 corrugates a plurality of sheets of a first material to form a first plurality of sheets of corrugated material (operation 702). Method 700 corrugates a plurality of sheets of a second material to form a second plurality of sheets of corrugated material (operation 704). Method 700 adheres the first plurality of sheets of corrugated material and the second plurality of sheets of corrugated material to form a honeycomb having an array of cells (operation 706). Method 700 cures the adhesive joining the array of cells of the honeycomb to form the combined material honeycomb core (operation 708). Afterwards, method 700 terminates.

In some illustrative examples, method 700 determines a desired value of a material characteristic (operation 712). In some illustrative examples, the material characteristic can include at least one of weight, strength to weight ratio, volume density, compressive strength, shear strength, heat transfer, electrical shielding, insulation, fatigue strength, or any other desirable characteristic. In some illustrative examples, the material characteristic can include at least one of corrosion/wear protection. In some illustrative examples, the material characteristic can include a mechanical property. In some illustrative examples, the material characteristic can include at least one of shear, tensile, compression, creep, impact, or fatigue and peel. In some illustrative examples, method 700 sets a ratio of the first material and the second material within the honeycomb based on the desired value of the material characteristic (operation 714).

In some illustrative examples, the first material is a first metallic material, and method 700 applies a surface treatment to the first material to increase adhesivity of the first material prior to adhering the first plurality of sheets of corrugated material and the second plurality of sheets of corrugated material (operation 716). In some illustrative examples, the surface treatment includes at least one of a mechanical treatment or a chemical treatment.

In some illustrative examples, method 700 adheres the first plurality of sheets of corrugated material and the second plurality of sheets of corrugated material to form a honeycomb comprises alternating the first material and the second material such that each cell of the combined material honeycomb core comprises both the first material and the second material (operation 718). By alternating the first plurality of sheets of corrugated material and the second plurality of sheets of corrugated material, half of each cell is formed of first material and half of each cell is formed of second material.

In some illustrative examples, method 700 adheres a first facesheet to a first face of the combined material honeycomb core (operation 720). In some illustrative examples, method 700 adheres a second facesheet to a second face of the combined material honeycomb core (operation 722). In some illustrative examples, adhering the second facesheet to the second face comprises adhering a composite sheet to the second face (operation 724). In some illustrative examples, adhering the first facesheet to the first face comprises adhering a metal sheet to the first face (operation 726). In some illustrative examples, adhering the first facesheet to the first face comprises applying a same adhesive material (operation 728).

Figure 8:
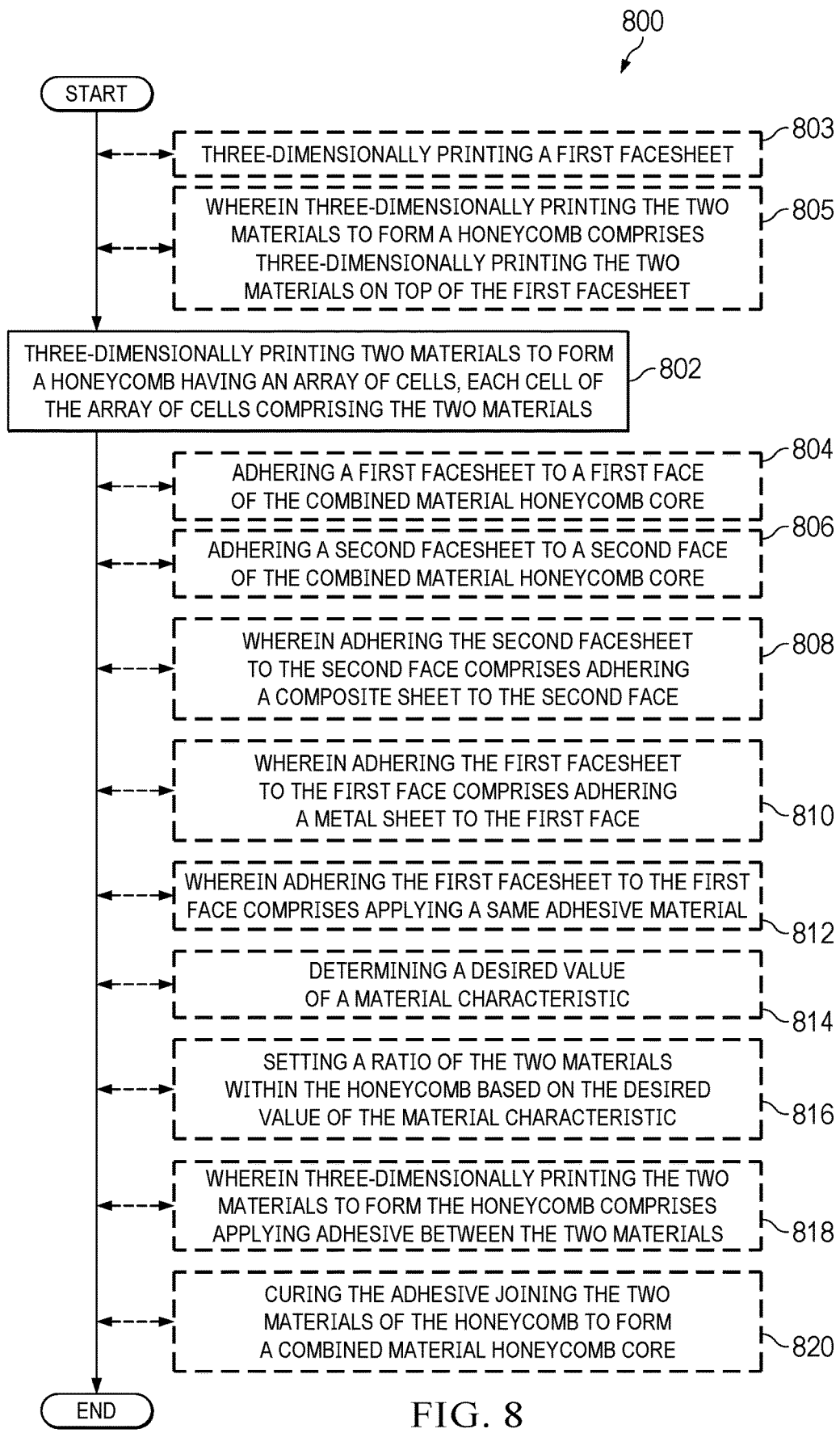
FIG. 8 is a flowchart of a method of manufacturing a combined material honeycomb core in accordance with an illustrative embodiment.

Turning now to FIG. 8, a flowchart of a method of manufacturing a combined material honeycomb core is depicted in accordance with an illustrative embodiment. Method 800 can be used to manufacture combined material honeycomb core for a portion of aircraft 100 of FIG. 1. Method 800 can be used to manufacture combined material honeycomb core 202 of FIG. 2. Method 800 can be used to manufacture combined material honeycomb core 502 of FIG. 5.

Method 800 three-dimensionally prints two materials to form a honeycomb having an array of cells, each cell of the array of cells comprising the two materials (operation 802). Afterwards, method 800 terminates.

In some illustrative examples, the two materials comprise a first metallic material and one of a second metallic material or a non-metallic material. In some illustrative examples, the first metallic material comprises aluminum and the second metallic material comprises titanium. In some illustrative examples, the non-metallic material comprises a composite material. In some illustrative examples, the first metallic material comprises aluminum and the non-metallic material comprises a composite material. In some illustrative examples, the non-metallic material comprises Nomex.

In some illustrative examples, method 800 three-dimensionally prints a first facesheet (operation 803). The first facesheet comprises any desirable material that can be three-dimensionally printed. In some illustrative examples, the first facesheet is a composite material. In some illustrative examples, the first facesheet is a metallic material.

In some illustrative examples, three-dimensionally printing the two materials to form a honeycomb comprises three-dimensionally printing the two materials on top of the first facesheet (operation 805). In some illustrative examples, after three-dimensionally printing the first facesheet, the two materials are three-dimensionally printed onto the first facesheet.

In some illustrative examples, three-dimensionally printing the two materials to form the honeycomb forms a combined material honeycomb core, and method 800 adheres a first facesheet to a first face of the combined material honeycomb core (operation 804). In some illustrative examples, three-dimensionally printing the two materials to form the honeycomb forms a combined material honeycomb core, and method 800 adheres a second facesheet to a second face of the combined material honeycomb core (operation 806). In some illustrative examples, the first facesheet and the second facesheet are formed of the same material. In some illustrative examples, the first facesheet and the second facesheet are formed of different types of materials. In some illustrative examples, at least one of the first facesheet or the second facesheet is formed of a metallic material. In some illustrative examples, at least one of the first facesheet or the second facesheet is formed of a composite material.

In some illustrative examples, adhering the second facesheet to the second face comprises adhering a composite sheet to the second face (operation 808). In some illustrative examples, adhering the first facesheet to the first face comprises adhering a metal sheet to the first face (operation 810). In some illustrative examples, adhering the first facesheet to the first face comprises applying a same adhesive material (operation 812).

In some illustrative examples, method 800 determines a desired value of a material characteristic (operation 814). In some illustrative examples, the material characteristic can include at least one of weight, strength to weight ratio, volume density, compressive strength, shear strength, heat transfer, electrical shielding, insulation, fatigue strength, or any other desirable characteristic. In some illustrative examples, the material characteristic can include at least one of corrosion/wear protection. In some illustrative examples, the material characteristic can include a mechanical property. In some illustrative examples, the material characteristic can include at least one of shear, tensile, compression, creep, impact, or fatigue and peel. In some illustrative examples, method 800 sets a ratio of the two materials within the honeycomb based on the desired value of the material characteristic (operation 816).

In some illustrative examples, three-dimensionally printing the two materials to form the honeycomb comprises applying adhesive between the two materials (operation 818). In some illustrative examples, method 800 cures the adhesive joining the two materials of the honeycomb to form a combined material honeycomb core (operation 820).

In some illustrative examples, three-dimensional printing of two different materials is performed together. In some illustrative examples, three-dimensional printing of Nomex and a metallic material is performed together. In some illustrative examples, three-dimensional printing of two different metallic materials is performed together. In some illustrative examples, three-dimensional printing of the honeycomb core is performed as part of a specification or requirement. In some illustrative examples, three-dimensional printing of the honeycomb core is performed for a small and/or complicated final shape of the sandwich structure.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 612 through operation 628 may be optional. For example, operation 712 through operation 728 may be optional. As another example, operation 803 through operation 820 may be optional.

Figure 9:
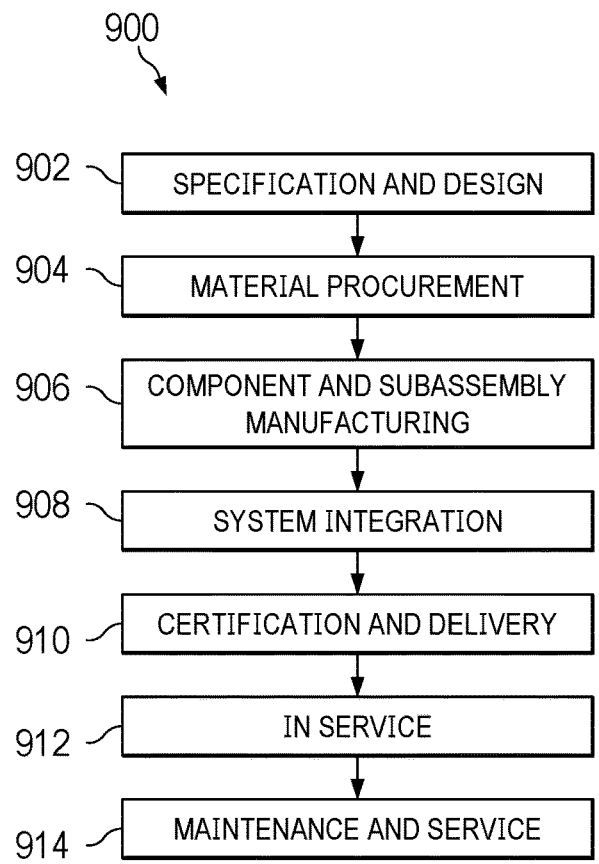
FIG. 9 is an illustration of an aircraft manufacturing and service method in the form of a block diagram in accordance with an illustrative embodiment.
Figure 10:
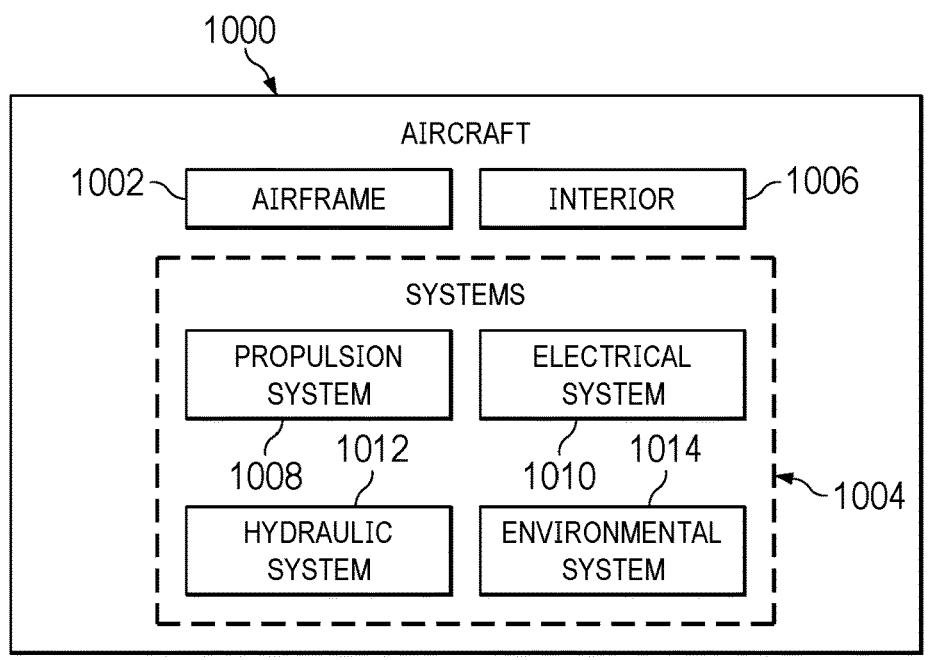
FIG. 10 is an illustration of an aircraft in the form of a block diagram in which an illustrative embodiment may be implemented.

Illustrative embodiments of the present disclosure may be described in the context of aircraft manufacturing and service method 900 as shown in FIG. 9 and aircraft 1000 as shown in FIG. 10. Turning first to FIG. 9, an illustration of an aircraft manufacturing and service method in the form of a block diagram is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 takes place. Thereafter, aircraft 1000 may go through certification and delivery 910 in order to be placed in service 912. While in service 912 by a customer, aircraft 1000 is scheduled for routine maintenance and service 914, which may include modification, reconfiguration, refurbishment, or other maintenance and service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft in the form of a block diagram is depicted in which an illustrative embodiment may be implemented. In this example, aircraft 1000 is produced by aircraft manufacturing and service method 900 of FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included.

Apparatuses and methods embodied herein may be employed during at least one of the stages of aircraft manufacturing and service method 900. One or more illustrative embodiments may be manufactured or used during at least one of component and subassembly manufacturing 906, system integration 908, in service 912, or maintenance and service 914 of FIG. 9.

The illustrative examples present combined material honeycomb cores and methods of manufacture. The illustrative examples recognize and take into account that Nomex is lower in weight than aluminum and other types of metal. Nomex has desirable levels of compression and shear and corrosion resistance.

Nomex core has less desirable temperature capability than aluminum and less comprehensive strength than aluminum.

The illustrative examples recognize and take into account that aluminum and other metals provide greater strength than Nomex and other non-metallic materials. However, aluminum produces a honeycomb core that is higher cost and has a higher density.

A combined material honeycomb core provides improved properties to the aircraft structures. A combined material honeycomb core provides the ability to tailor the mechanical properties through the choice of materials and ratios of materials in the combined material honeycomb core. A combined material honeycomb core can provide increased strength to weight ratio, less maintenance, and improved revenue.

A combined material honeycomb core with aluminum and Nomex is a lightweight, recyclable material. A combination of aluminum and Nomex that offers an increased stiffness with one of the highest strength to weight ratios of any structural core material available.

A combination of metallic and Nomex honeycomb can provide improved properties to a composite structure. A combined material honeycomb core provides material advantages of both metallic & Nomex honeycombs. Composite material in a combined material honeycomb core provides a tension benefit while aluminum or other metallic material can provide improved compression. The combination material honeycomb core can reduce the amount of moisture absorbed within the core in comparison to a fully non-metallic core. Facesheets for a structural panel comprising combined material honeycomb core can take the form of either composite or metal face sheets. In some illustrative examples, an aluminum facesheet can have a film between it and the combined material honeycomb core to avoid undesirable galvanic behaviors. An exterior aluminum face sheet can reduce water ingress.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of manufacturing a combined material honeycomb core, the method comprising:
    printing adhesive lines onto a sheet of a metallic material and a sheet of a meta-aramid material;
    cutting the sheet of the metallic material and the sheet of the meta-aramid material into portions;
    stacking the portions to form a stack comprising alternating layers of adjacent sheets of the metallic material and the meta-aramid material;
    curing the adhesive in the stack to form an adhered stack; and
    forming, by expanding the adhered stack, the combined material honeycomb core.

2. The method of claim 1, wherein the combined material honeycomb core is recyclable, and further comprising applying a surface treatment to the sheet of the metallic material to increase adhesivity of the metallic material.

3. The method of claim 1 further comprising:
    determining a desired value of a material characteristic; and
    setting a ratio of the metallic material and the meta-aramid material within the stack based on the desired value of the material characteristic.

4. The method of claim 1, wherein each cell of the combined material honeycomb core comprises half the metallic material and half the meta-aramid material.

5. The method of claim 1, further comprising:
    adhering a first facesheet to a first face of the combined material honeycomb core; and
    adhering a second facesheet to a second face of the combined material honeycomb core.

6. The method of claim 5, wherein adhering the second facesheet to the second face comprises adhering a composite sheet to the second face.

7. The method of claim 6, wherein adhering the first facesheet to the first face comprises adhering a metal sheet to the first face.

8. The method of claim 6, wherein the second facesheet comprises a non-metallic composite.

9. The method of claim 1, wherein the combined material honeycomb core comprises a plurality of cells regularly arranged in an array.

10. The method of claim 9, wherein each cell of the plurality of cells comprises a first half of the metallic material and a second half of the meta-aramid material.

11. The method of claim 10, wherein the metallic material comprises aluminum and titanium.

12. The method of claim 1, wherein a cell in the combined material honeycomb core comprises a triangular shape.

13. The method of claim 1, wherein a cell in the combined material honeycomb core comprises a circular shape.

14. The method of claim 1, wherein a cell in the combined material honeycomb core comprises a square shape.

15. A method of manufacturing a combined material honeycomb core, the method comprising:
    corrugating a plurality of sheets of a metallic material and forming a first plurality of sheets of corrugated material;
    corrugating a plurality of sheets of a meta-aramid material and forming a second plurality of sheets of corrugated material;
    adhering the first plurality of sheets of corrugated material and the second plurality of sheets of corrugated material in a stack of sheets comprising alternating adjacent sheets from the metallic material to the meta-aramid material and forming a honeycomb having an array of cells; and
    curing the adhesive joining the array of cells of the honeycomb and forming the combined material honeycomb core.

16. The method of claim 15, wherein the combined material honeycomb core is recyclable, and further comprising:
    applying a surface treatment to the metallic material to increase adhesivity of the metallic material prior to adhering the first plurality of sheets of corrugated material and the second plurality of sheets of corrugated material.

17. The method of claim 15 further comprising:
    determining a desired value of a material characteristic; and
    setting a ratio of the metallic material and the meta-aramid material within the honeycomb based on the desired value of the material characteristic.

18. The method of claim 15, wherein each cell of the combined material honeycomb core comprises both a first half of the metallic material and a second half of the meta-aramid material.

19. The method of claim 15, wherein a cell in the combined material honeycomb core comprises a square shape.

20. The method of claim 15, wherein a cell in the combined material honeycomb core comprises a circular shape.

* * * * *